W. D. KEEFER.
GLASS TAKING APPARATUS.
APPLICATION FILED NOV. 23, 1908.
966,753.
Patented Aug. 9, 1910.
3 SHEETS—SHEET 1.
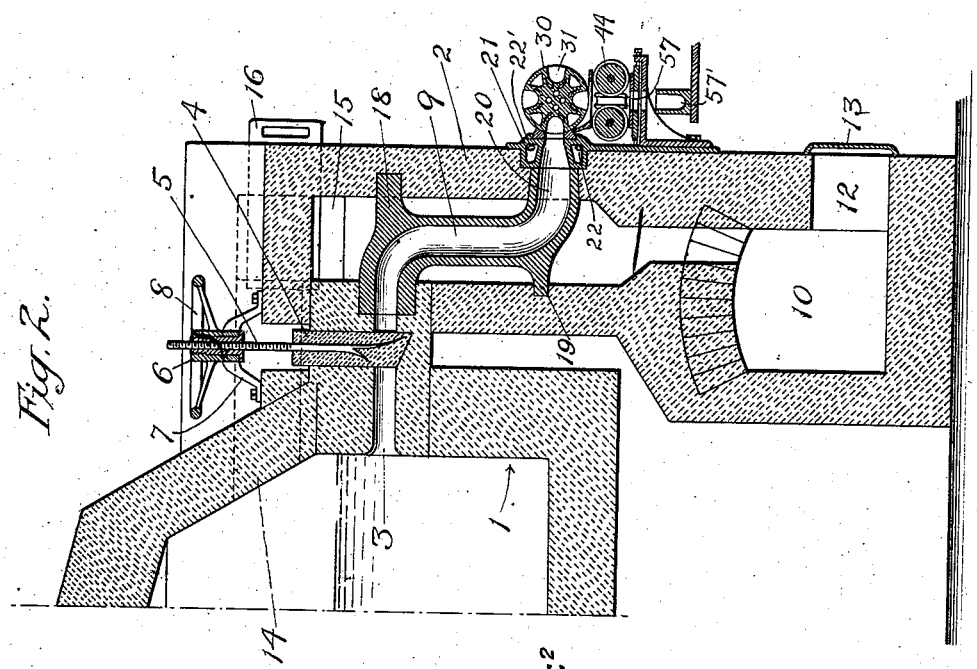
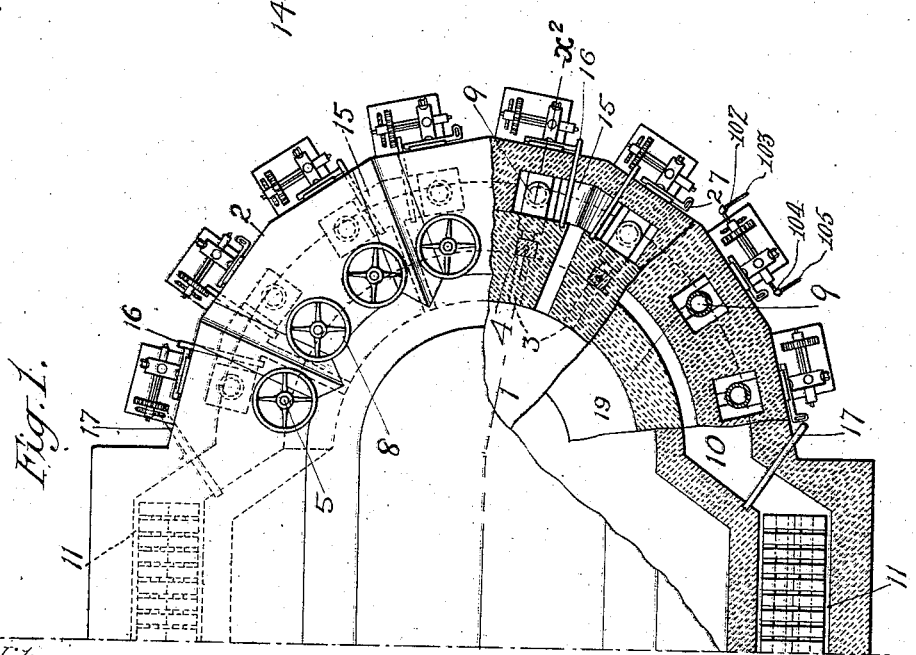

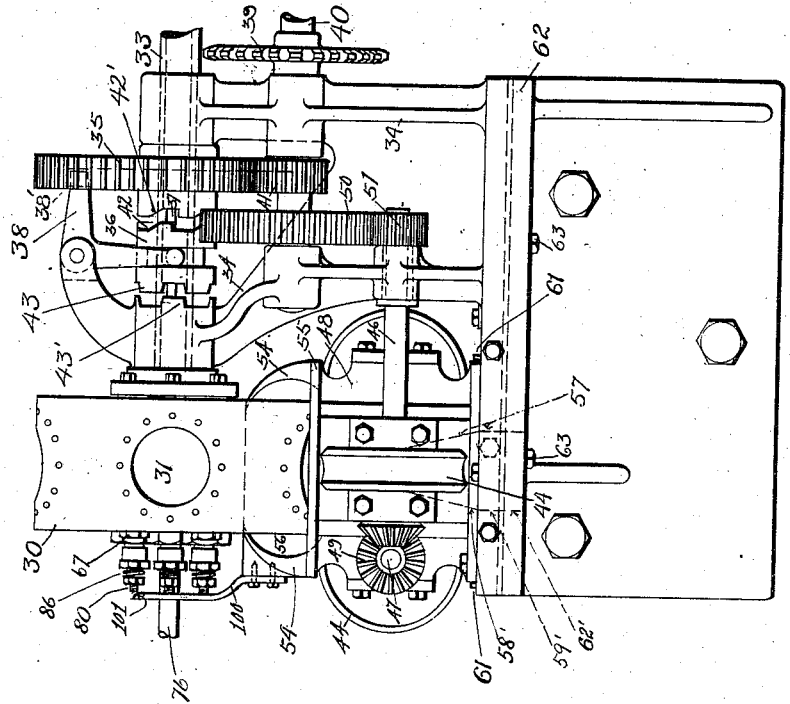

W. D. KEEFER.
GLASS TAKING APPARATUS.
APPLICATION FILED NOV. 23, 1908.
966,753.
Patented Aug. 9, 1910.
3 SHEETS—SHEET 3.
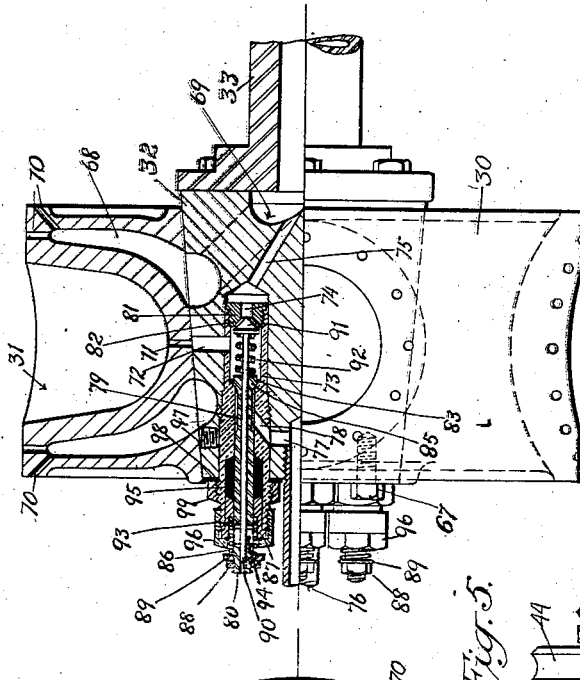
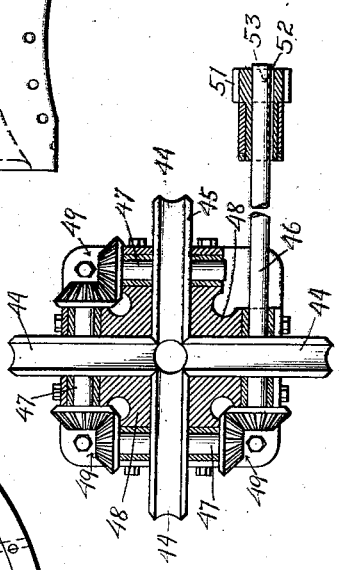
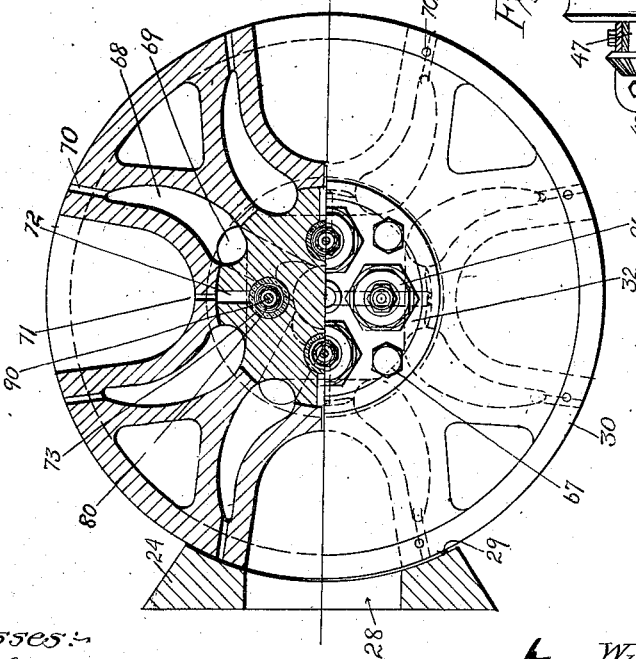
Witnesses:—
Frank L. Graham
Louis W. Gratz
Inventor,
William D. Keefer
by Townsend & Hackley
Attorneys

UNITED STATES PATENT OFFICE.

WILLIAM D. KEEFER, OF LOS ANGELES, CALIFORNIA.

GLASS-TAKING APPARATUS.

966,753.   Specification of Letters Patent.   Patented Aug. 9, 1910.

Application filed November 23, 1908. Serial No. 464,186.

*To all whom it may concern:*

Be it known that I, WILLIAM D. KEEFER, a citizen of the United States, residing at Los Angeles, in the county of Los Angeles and State of California, have invented certain new and useful Improvements in Glass-Taking Apparatus, of which the following is a specification.

This invention relates to glass manufacture, and more particularly to that step in the process in which the glass is removed from the tank or receptacle containing the molten mass and delivered to the apparatus where it is formed into the desired shape or article.

In the manufacture of articles from glass in which the same amount of material is required for each of a series of similar articles it is very important that the glass be removed or withdrawn from the tank or other receptacle expeditiously and accurately and that the mechanism for accomplishing this purpose be so constructed as to be easily manipulated and changed or otherwise adjusted, when necessary, and also that means be provided for preventing the molten material from sticking to any part of the mechanism and thereby rendering such mechanism defective or inoperative. It is also desirable that the glass be taken or withdrawn from the tank at a point below the normal or minimum level of the material in the tank so as to always insure a sufficient amount passing to the "taking" mechanism at all times to properly form each and every article of the series being formed. It is also desirable to utilize the heat of the furnace in retaining the material in a molten or semi-plastic condition while it is passing from said outlet to the taking mechanism. It is also desirable to locate the taking mechanism at such a point below the outlet from the tank as to utilize the weight of a column of material in assisting in forcing the material into the taking mechanism at the proper time. It is also desirable to utilize the power of suction for assisting in causing the material to enter the taking mechanism and then utilize fluid pressure, if desired, in discharging the same. It is also desirable to provide means for shutting off or stopping the flow of molten glass from the tank to the taking mechanism at any time, as in case of an accident, or for other reasons. I secure these and other advantages by the means and mechanisms hereinafter more fully set forth and illustrated in the accompanying drawings in which—

Figure 1 is a top plan view partly in section of a portion of a glass furnace provided with my invention. Fig. 2 is a vertical sectional view of the same on the line $x^2$—$x^2$ of Fig. 1. Fig. 3 is an enlarged partly sectional view through the glass taking mechanism. Fig. 4 is a side elevation of the same at right angles to Fig. 3, the operating mechanism being also shown in side elevation. Fig. 5 is a top plan view of the ingot forming mechanism, partly in section. Fig. 6 is an end elevation, partly in section, of the shearing head. Fig. 7 is a side elevation, partly in section, of the shearing head.

Referring more particularly to the drawings, 1 indicates the tank of a regenerative glass furnace which may be of any usual or desired form, size and construction. Arranged around the work end or front of the same are casings 2, each embodying or provided with my taking apparatus, said apparatus being preferably secured to the usual vertically arranged buck stays in any desired manner. The tank is provided with outlets 3 which are located at any point between the glass level indicated in Fig. 2 and the bottom of the tank. A vertically movable gate 4 is arranged so as to close or control each outlet. This gate is preferably formed from a slab of fire clay in the usual manner, within which is embedded a lock or stem 5 which projects upwardly above the same and is screw threaded and passed through a nut 6 which is mounted in a standard 7 and adapted to be rotated by the hand wheel 8 for raising and lowering the gate. Communicating with the outlet and extending substantially vertical for a suitable distance below the same is a chute or conduit 9 which I shall call a "boot" having its inlet at the top of the leg and its discharge orifice or outlet 20 at the toe. The boot is preferably inclosed in the shield or casing 2 which extends from a point above the top of the boot down to and below the bottom thereof and communicates with a suitable conduit 10 which in turn communicates with the ordinary checker work 11 of the furnace. An opening 12 is provided through the front wall of the casing into the conduit 10 through which any glass or other matter that may have fallen down into the flue can be removed, said opening being adapted to be closed by means of a door 13. The upper end or portion of each casing communicates with the interior of the tank above the glass level, as through a conduit 14, whereby the heated gases from the interior of the tank are drawn out through the conduit 14, down through the casing 2 around the boot 9, into conduit 10 and finally discharged into the checker work 11 from whence they are passed to the chimney or stack of the furnace, not shown. Each conduit 14 is preferably arranged to communicate with two casings, as by communicating at its outer end with a conduit 15 which communicates at its ends with said two casings, as shown by dotted lines in Fig. 1. A suitable damper 16 is arranged in each end of the conduit 15 so that either casing can be closed off from the conduit 14 without interfering with the operation of the companion casing. To insure the passage of the heated air from the tank downward into the conduit 10 without the possibility of the cold air from one of the generators being drawn upward around the boot and thereby cooling it, dampers 17 are provided, one of which, as the one nearest to the cooling furnace or regenerator is closed and the other one is open, and vice versa when the regenerators are being used in the reverse order. By arranging the parts of the furnace in this manner the glass in the boot can be kept at any desired temperature so as to secure the proper manipulation of the same when it is being formed or fashioned into the desired articles. To prevent the pressure of the glass at the outlet 3 from the tank pushing the top of the boot out of engagement with the tank a brace or bracket 18 is provided which engages with or is seated in the outer wall of the casing 2, and to prevent the lower end of the boot from being forced backward toward the tank by the glass pressure a similar bracket or brace 19 abuts against or is seated within the inner wall of the casing.

It is a well known fact that iron tools or the portion of a furnace with which melted glass comes in contact must be kept below a red heat or below the temperature at which the molten glass must be maintained to secure the desired degree of fluidity to prevent sticking, and therefore it is necessary that means be provided for cooling the orifice 20 or toe of the boot, at which point the molten glass is discharged into the taking mechanism. To accomplish this purpose I provide a water jacket 21, preferably of cast iron, which is connected with or secured to the casing 2 in any desired manner. The interior or cavity of the jacket is connected with a source of refrigeration, which may be liquid or fluid, in any desired manner, as through an inlet opening 22 and outlet 22'. The jacket 21 is provided with an opening 23 that registers with the orifice 20 and forms a continuation of the same for the passage or discharge of the molten glass. A plate 24 is removably seated in the outer face of the jacket, as by means of the dovetailed walls 25 forming a way in which said plate is slidable laterally with respect to the opening of the conduit. The plate is preferably held in position between said walls by means of one or more set screws 26 and is preferably provided at one end with a loop 27 by means of which it may be withdrawn or removed from the jacket. When the boot is to be entirely closed to prevent the escape of glass an imperforate plate is used, but when the machine is in use a plate is used that is provided with an opening 28 which is adapted to register with the opening through the water jacket and thereby control the escape or passage of the melted glass, a plate being used having a perforation of the desired size to correspond with the amount of glass which must be permitted to escape to form any desired article. The outer face of the plate is preferably concaved, as shown at 29, within which a portion of the periphery of a cylindrical shearing head or carrier 30 is adapted to be rotated. The periphery of the head is provided with a series of pockets or cavities 31 which are adapted to be successively moved into and out of register with the opening 28 in the plate 24 for receiving the molten glass from the tank through the boot 9. The contacting portions of the periphery of the head and of the correspondingly concaved face of the plate 24 are so adjusted that the edges of the pockets 31 and of the opening 28 will shear or cut off the glass in a clean manner without leaving stringy portions or ragged edges. As the plates 24 are arranged to be removed and inserted by moving them parallel with the axis of the head, such removal or insertion can be readily accomplished by moving the head a very slight distance away from the plate, thereby permitting of a quick and easy adjustment or change of the gates at any time when it is desired to use a greater or less quantity of glass to form the desired articles.

The shearing head or carrier 30 is substantially annular having its opening tapered so as to fit upon a substantially frusto-conical mandrel 32 which is carried by or connected with a shaft 33 which has its bearings in a suitably designed frame 34. The shaft and mandrel are driven in any suitable manner, as by means of a gear wheel 35 that is loosely mounted thereon and adapted to be intermittently connected therewith by a sliding clutch 36. The clutch is non-rotatably connected with the shaft by means of an ordinary key and feather 37 and is arranged to be reciprocated freely thereon in any manner, preferably by means of a bell crank lever 38 which has one end forked for engaging with the clutch 36 and the other end adapted to be engaged by a suitable cam 38' within the rim of the gear wheel 35. The wheel 35 is driven at a constant rate of speed from any suitable source of power, not shown, through gear 39, shaft 40 and pinion 41, and the ends of the clutch member 36 are each provided with properly shaped teeth or shoulders 42 and 43 for engaging respectively with teeth 42' and 43' on the hub of the wheel 35 and on the shaft bearing in the frame 34, that is, the teeth 42 and 42' are preferably arranged abruptly upon one side and inclined upon the other and at a great enough distance apart to permit of the teeth being perfectly seated or interlocked before their abrupt faces come in contact, thereby insuring a positive drive or movement to the shearing head whenever it begins to move. The teeth 43 and 43', on the contrary, are preferably inclined upon both faces so that in case the recess 31 in the head does not accurately register with the orifice or opening in the plate 28 when the clutch is shifted to stop and lock the head against further movement the final or complete seating of the teeth 43 and 43' will cause a sufficient movement of the head in one direction or the other to cause said recess to register perfectly with said orifice, thereby insuring perfect operation of the machine, even though when run at a very high rate of speed.

Located directly below the shearing head is the ingot forming mechanism which preferably comprises a plurality of vertically arranged wheels 44 four being preferably used with their peripheries in contact and recessed to correspond with the desired shape or cross section which it is desired to give to the ingot, a cylindrical form being preferably used and shown in the drawings. In this construction and arrangement of the formers 44 the periphery of each is beveled or inclined, as shown at 45, which extends from the outer edge of the recess to the inner rim of the wheel and thereby forms a perfectly close fitting joint which will prevent the escape of any material when the latter is being compressed by the rotation of the formers, which rotation is downward at said point. The formers are located opposite each other, as shown more particularly in Fig. 5, and are mounted upon shafts 46 and 47, said shafts being suitably journaled in the frame 48 which carries said mechanism. Three sets of bevel gearing 49 are mounted upon said shafts and transmit motion to all of the formers 44 simultaneously, which motion is originally transmitted through the shaft 46 from the shaft 40 by means of a gear wheel 50 and pinion 51. The pinion 51 is sleeved within its bearing in the frame 34 and is provided with a fixed key or feather 52 which is adapted to fit within a key seat 53 in the shaft.

By constructing the gearing and other elements of the taking mechanism and ingot forming mechanism in the above described manner it will be seen that the shearing head of the taking mechanism is adapted to be run intermittently, whereas the ingot forming mechanism is run constantly, thereby providing means for forming an ingot at any time that the desired amount of material is delivered to it from the shearing head.

The frame 48 within which the formers 44 are mounted has its upper portion provided with a wall 54 which rises from the substantially circular top 55 of the frame upon the side adjacent to the casing 2 so as to partially envelop or encircle a portion of the shearing head, as shown more particularly in Figs. 3 and 4. The inner face of the wall or projection 54 is recessed or cupped out as shown at 56, so as to form a substantially hopper shaped cavity or receptacle which extends down to the contacting portions of the peripheries of the former wheels 44 and thereby guide the material that falls from the shearing head down into the space between said formers, whereby it is grasped and gradually forced down between the formers and compressed into the desired shape. As the wall 54 terminates substantially vertically under the center of the shearing head the top of the head from that point onward is substantially flat, as shown more particularly in Fig. 3, which thereby gives an unobstructed view through said cavity 56 upon each side of the head 30, as shown more particularly in Fig. 4, whereby the attendant is enabled to see whether the mechanism is operating properly or not, and also whether the material is passing down through the ingot forming mechanism. The lower part of the frame below the contacting points of said formers is preferably gradually flared outwardly, as shown at 57, so as to prevent the possibility of the ingot catching upon any obstructions after it has been properly formed and is being dropped down into the receptacle 57' which passes it to the article forming mechanism, not shown.

The base 58 of the frame 48 is mounted upon the base 59 of the frame 34 so that by removing the bolts 60 the entire frame with its ingot forming mechanism can be quickly removed therefrom so as to withdraw the shaft 46 from the sleeve of the pinion 51 and a different frame and mechanism can be as quickly substituted therefor, thereby enabling the machine to be changed very easily to adapt it for forming ingots of different size or shape or both. To assist in properly positioning the base 58 guide pins 61 are preferably located in the base 59 at the sides and inner end of the base 58. After the ingot forming mechanism has been properly positioned it is rigidly secured to the base 59 by means of the bolts 60, and the base 59 is properly adjusted or positioned upon a bracket 62 and rigidly secured thereto by means of the bolts 63. In positioning the base 59 upon the bracket three vertical screws or bolts 64 are preferably passed down through it so as to rest upon the top of the bracket, two of said screws being located adjacent to the water jacket 21 and the other one in front. In addition to these means for adjusting the base vertically three horizontally arranged screws 65 are provided, by means of which the base can be adjusted in its own plane. Three of these screws are preferably employed, one of which is mounted in the water jacket frame 21 substantially midway of the side of the base, and the other two are passed through a flange 66 that projects upwardly from the outer edge of the bracket 62, one of said screws being located adjacent to each outer corner of said base. The bases 58 and 59 and the bracket 62 are perforated, as shown at 58', 59' and 62' respectively, so as to form an uninterrupted passage or opening between the lower end of the opening 57 and the ingot carrier 57'. By means of the two sets of triple screws arranged in this manner the frame 34 can be so adjusted relatively to the plate 24 that a perfect fit can always be secured insuring a perfect shearing surface and preventing the escape of any surplus material between the plate and the periphery of the shearing head.

The shearing head 30 is detachably mounted upon its support 32 in any suitable manner as by means of screws 67 which enter the head 32 and have their heads projecting over the end of the head, as more clearly shown in Figs. 3 and 4. The bore of the head 30 is preferably slightly tapered so as to fit the slightly tapered support 32 and thereby secure a very close fit when the screws 67 are screwed into the support or mandrel 32 these screws serving to crowd the sleeve onto its tapering support 32. The shearing head 30 is preferably cooled or kept from becoming overheated by means of a refrigerant, a liquid, fluid or gases, such as cool air being introduced into cavities 68 formed therein around each of the pockets or recesses 31. The air is preferably introduced through the shaft 33 which is made hollow for this purpose, the inner end of the bore of the shaft being branched, as shown at 69, with one end of each branch communicating with one of the cavities 68. To permit of the refrigerant escaping and thereby securing the necessary circulation to prevent the refrigerant being overheated by its contact with the shearing head, it is permitted to escape through suitable channels or openings 70 through the walls of the head. The rotary member is provided with outlet means communicating with the pockets for escape of air therefrom. To provide for this and to provide means for causing a suction to take place within each of the pockets 31 when said pocket is being filled with material by the action of gravity on the glass in the conduit, and also to force air into the bottom of the pocket for the purpose of expelling the mass of material therein, or both, a perforation 71 is formed in the bottom of each pocket or recess which communicates with a perforation 72 in the support or mandrel 32 which in turn communicates with a valve casing 73, said casing communicating with the hollow of the shaft 33 through a perforation 74 in its bottom and a passage or perforation 75 leading therefrom to the hollow of said shaft, as clearly shown in Fig. 6. Said casing 73 also communicates with a source of suction, not shown, through suitable connections 76 and perforations 77 and 78 in the support 32 and the casing 73 respectively. The inner end of the passage 78 communicates with an annular space 79 formed around a reciprocatory valve stem 80 that is mounted in said casing. The casing 73 preferably has a plug 81 screwed into its inner end, which plug is bored longitudinally so as to form the perforation 74, and has its inner end countersunk to form the valve seat 82, while a corresponding valve seat 83 is formed upon the opposite side of the perforation 72 by reducing the diameter of the bore of said casing to form a cavity 84. A valve 85 formed upon the inner end of the stem 80 is adapted to be held yieldingly upon the seat 83 by means of a spring 86 that is seated in a cavity in the gland or packing nut 87, and has its outer end in engagement with an adjustable shoulder on the stem 80; as a nut 88 or a washer 89 which may be located between said nut 88 and the outer end of the spring. The stem 80 is bored longitudinally for the reception of a stem 90 that is reciprocally mounted therein and has a valve or head 91 upon its inner end which is adapted to be held yieldingly in engagement with the seat 82 by means of a spring 92 that abuts against the inner end of the stem 80 at one end and against the head or valve 91 at the other. The movement of the valve 91 is controlled by a pin 93 in the stem 90 which passes through a slot 94 in said stem 80, see Fig. 7. As stem 80 in its normal position is carried outward through medium of spring 86 to seat valve 85 on seat 83 pin 93 is engaged by inner end of slot and valve 91 is carried outward off its seat 82 in reverse action as stem 80 is carried inward to unseat valve 85 and seat valve 91. Spring 92 allows valve 85 to still further open after valve 91 is closed, pin 93 sliding in slot in stem 80 as the latter moves in to still further open valve 83. Suitable packing material 95 is secured in the casing around the stem 80 by means of the gland 87, and a perforated cap 96 is preferably screwed onto the outer end of the casing to hold said gland in position. The casing is preferably held within the support or mandrel 32 by screwing thereonto and is locked in position by means of the threaded plug 97, and leakage between the outer wall of the casing and the socket in the mandrel is prevented by a suitable washer or packing 98 that is held in position on the casing by a nut 99.

In using the above described controlling mechanism means must be provided for automatically actuating said valves at the proper time to cause the suction to begin at any desired point, preferably when the recesses 31 in the shearing head 30 reach the upper edge of the shearing plate 24 and should continue until after the pocket or recess has been filled with material, when the suction should be shut off and the pressure permitted to exert its force and thereby assist in discharging the mass of material from the pocket if there should be any tendency for it to stick or remain in said cavity. One means for accomplishing this purpose is by securing a cam plate or actuator bar 100 upon one end of the wall 54 with its free end extended up into the path of the outer ends of the stems 80 as they are carried around by the rotation of the shaft 37, said end being preferably inclined, as shown at 101, to permit of the stem engaging therewith and being gradually forced inward as they are thus carried around. As the stem is thus forced inward the valve 91 is yieldingly forced upon its seat so as to shut off the current of air or other refrigerant entering through the shaft 37 and simultaneously therewith force the valve 85 off its seat 83 and permit the suction through the connection 76 to take place through the perforations 77, 78, 72 and 71. As soon as the end of the stem 80 passes out of engagement with the bar 100 the spring 86 immediately expands and returns the stem 82 to its normal position which seats the valve 85 and unseats the valve 91 and thereby permits the entrance of the refrigerant from the shaft 37. By providing a valve casing for each of the pockets with the outer end of each valve stem 80 adapted to successively engage with the actuator bar 100 each recess as it approaches the orifice of the boot or conduit has a suction set up therein which will materially assist in permitting the recess to be filled by instantly removing the air from within the pocket and immediately after it has been filled pressure will be automatically applied at the bottom of the pocket for expelling said material.

By constructing the glass taking apparatus of a glass furnace as above described, a series of similar articles can be very rapidly and accurately formed and the operation will be absolutely automatic, thereby dispensing with labor of any kind except that which is required to see that the machine performs its proper functions and to make the necessary changes in the different parts whenever it is desired to change the output of the machine. The molten material can be taken from the tank at such a point below the glass level as will always insure a sufficient amount passing into the materials for each article, and a better grade of glass can be secured, as the possibility of the dross upon the top of the mass passing into the mold is absolutely prevented. The heat from the furnace is utilized for retaining the glass in its melted condition in passing from the tank to the taking apparatus and the temperature of all the parts can be controlled or regulated to comply with a condition necessary to the proper working of the apparatus, thereby securing accuracy and substantial perfection in the operation of the machine.

Refrigerating means is supplied to the hollow shaft 33 by a swivel connection or coupling shown at 102 in Fig. 1 which communicates with a pipe or hose 103 leading to any suitable source of compressed air. Similarly, the suction pipe 76 is connected by a swivel coupling 104 with a pipe 105 leading to any suitable suction applying means.

Having described my invention, I claim:

1. In a glass manufacturing apparatus, a tank provided with an outlet, a conduit communicating therewith, rotary cylindrical glass taking apparatus rotatable in a vertical plane for said conduit adapted to sever the material escaping from said conduit into blanks, a plate between the conduit and the glass taking apparatus conforming to the shape of the glass taking apparatus and provided with an opening at which the glass is severed, and supporting means for said plate provided with a way in which the plate is horizontally slidable.

2. In a glass manufacturing apparatus, a tank provided with an outlet, a conduit communicating therewith, rotary cylindrical glass taking apparatus rotatable in a vertical plane for said conduit adapted to sever the material escaping from said conduit into blanks, a plate between the conduit and the glass taking apparatus conforming to the shape of the glass taking apparatus and provided with an opening at which the glass is severed, supporting means for said plate provided with a way in which the plate is horizontally slidable, and fastening means for fastening the plate in fixed position on its support.

3. In a glass manufacturing apparatus, a tank provided with an outlet communicating with the tank below the glass level, a descending conduit communicating with said outlet, a casing communicating with the upper part of the tank above the glass level, said casing surrounding the conduit for heating said conduit by heated air from the interior of the tank, and glass taking mechanism at the lower end of said conduit.

4. In glass manufacturing, a furnace, a tank provided with an outlet communicating with the tank below the glass level, a descending conduit communicating therewith at its upper end, a casing surrounding said conduit and communicating at the top with the tank above the glass level and with the furnace at the bottom, and glass taking mechanism at the lower end of the conduit.

5. In glass manufacturing, a furnace, a tank provided with outlets, a descending conduit communicating with each outlet, a casing over each conduit, a conduit communicating with the upper end of two adjacent casings and with the interior of the tank above the glass level, and a valved conduit leading from the lower end of said casings to the furnace, and glass taking apparatus at the lower end of each first mentioned conduit.

6. In glass manufacture, a regenerative furnace having a conduit between the checker works thereof, a valve at each end of said conduit, a tank provided with an outlet, a casing communicating with the tank at the top and with the conduit at the bottom, a descending conduit in said casing communicating at its upper end with said outlet, and glass taking apparatus communicating with the outlet of said last mentioned conduit.

7. In glass manufacturing, a tank provided with an outlet, a boot like conduit communicating therewith at its upper end and having a laterally extending discharge outlet at its toe, means for heating the main portion of said conduit, means for cooling said outlet, and glass taking mechanism at the outlet of the conduit.

8. In glass manufacturing, a tank provided with an outlet, communicating with the tank below the glass level, a boot like conduit communicating therewith having a laterally extending outlet at its toe, a casing around the main portion of said conduit, a casing communicating with the tank above the glass level and surrounding the conduit for permitting heated gases from the interior of the tank to pass down and around the main portion of said conduit, a water jacket upon the casing around the outlet of the conduit, and glass taking mechanism at the outlet of said conduit.

9. In a glass manufacturing apparatus, a tank, a conduit communicating therewith, a rotary cylindrical member adjacent to the outlet of said conduit adapted to receive glass therefrom and to sever it into blanks as it is being received, a plate between said conduit and said rotary member and having a concave face fitting the face of the rotary member, and supporting means for said plate provided with a way wherein the plate is slidable in the direction of the axis of rotation of the rotary member.

10. In a glass manufacturing apparatus, a tank, a conduit communicating therewith, a rotary cylindrical member adjacent to the outlet of said conduit having its periphery provided with pockets for receiving glass from said conduit, a plate extending between the conduit and said rotary member, one face of said plate conforming with the shape of the rotary member, the edge of said rotary member around each pocket being adapted to sever the contents of its pocket from the material in the conduit, and supporting means for said plate provided with a way wherein the plate is slidable in the direction of the axis of rotation of the rotary member.

11. In glass taking apparatus, a conduit adapted to communicate with a glass tank and having an outlet, a rotary member adjacent to said outlet having its periphery provided with pockets adapted to be moved into and out of register therewith, a cavity surrounding each pocket, and means for filling said cavities with a refrigerant, said pockets being provided with outlet means communicating therewith for escape of air therefrom while they are being filled with glass.

12. In a glass manufacturing apparatus, a glass tank, a conduit communicating therewith and having an outlet, a perforated concaved closure plate for the outlet, a rotary cylindrical member in engagement with the concave portion of said plate having its periphery provided with pockets which are adapted to be moved into and out of register with the perforations of said plate, said pockets being provided with outlet means communicating therewith for escape of air therefrom while they are being filled with glass, and means for supporting said rotary member.

13. In glass taking apparatus, an outlet adapted to communicate with a glass tank and having an outlet, a tapering support adjacent to said outlet, a sleeve like member on said support having its interior tapered to correspond therewith and having its periphery provided with pockets adapted to register with said outlet, means for crowding said sleeve on to said support, and means for intermittently rotating the support and sleeve, said pockets being provided with outlet means communicating therewith for escape of air therefrom while they are being filled with glass.

14. In glass taking apparatus, a conduit adapted to communicate with a glass tank and having an outlet, a shaft provided with a support adjacent to said outlet, an interchangeable shearing head on said support having its periphery provided with pockets adapted to be moved into and out of register with said outlet, a wheel loosely mounted on the shaft and provided with cams, a reciprocatory clutch non-rotatably mounted upon the shaft, and means connected with the clutch for moving the same into and out of engagement with said head, said means being adapted to be actuated by the cams on said wheel, said pockets being provided with outlet means communicating therewith for escape of air therefrom while they are being filled with glass.

15. In glass taking apparatus, a conduit adapted to communicate with a glass tank and provided with an outlet, a shaft provided with a mandrel adjacent to said outlet, an interchangeable shearing head on said mandrel having its periphery provided with pockets adapted to register with said outlet, a support for said shaft, a wheel loosely mounted on the shaft, provided with cams, a circumferentially grooved sleeve non-rotatably mounted upon the shaft, and a bell crank lever on said support having one of its arms within the groove of the sleeve and the other in the path of said cams, said pockets being provided with outlet means communicating therewith for escape of air therefrom while they are being filled with glass.

16. In glass taking apparatus, a conduit adapted to communicate with a glass tank and provided with an outlet, a hollow shaft provided with a perforated mandrel adjacent to said outlet, a shearing head on said mandrel having its periphery provided with pockets and adapted to register with said outlet, said head being provided with a cavity around each pocket, which cavities communicate with the perforations of said mandrel, said pockets being provided with outlet means communicating therewith for escape of air therefrom while they are being filled with glass.

17. In glass taking apparatus, a conduit adapted to communicate with a glass tank and provided with an outlet, a perforated mandrel rotatably mounted adjacent to said outlet, and a shearing head on said mandrel provided with pockets in its periphery adapted to register with said outlet, the bottom of each pocket being perforated to communicate with one of said perforations, and means for passing air through said perforations.

18. In glass taking apparatus, a conduit adapted to communicate with a glass tank and provided with an outlet, a recessed mandrel rotatably mounted adjacent to said outlet, a pocketed shearing head on said mandrel provided with perforations which are adapted to establish communication between the pockets of the head and the recesses of the mandrel, and valve mechanisms in the mandrel for permitting air to pass in either direction to or from said pockets.

19. In glass taking apparatus, a conduit adapted to communicate with a glass tank and provided with an outlet, a recessed rotary member adjacent to said outlet having its periphery provided with pockets which communicate with said recesses, a valve for each recess comprising a casing having two valve seats, two spring pressed valves in the casing, one of which has its stem projecting beyond the outer end thereof, means for engaging with the outer end of said valve and forcing it inward when said pocket registers with said outlet, and means for permitting air to pass through said recesses and valves.

20. In glass taking apparatus, a conduit adapted to communicate with a glass tank and provided with an outlet, a rotary member adjacent to said outlet provided with pockets in its periphery adapted to register therewith, said pockets being provided with outlet means communicating therewith for escape of air therefrom while they are being filled with glass, and ingot forming mechanism below said member and adapted to receive the blanks of glass discharged from said pockets, said ingot forming mechanism comprising pressure means adapted to exert compresssion on the glass ingot to form the same.

21. In glass taking apparatus, a conduit adapted to communicate with a glass tank and provided with an outlet, a rotary member adjacent to said outlet provided with pockets in its periphery adapted to register therewith, ingot forming mechanism below said member comprising a plurality of wheels, each having its periphery recessed circumferentially, and means for rotating said wheels in unison, said pockets being provided with outlet means communicating therewith for escape of air therefrom while they are being filled with glass.

22. In glass taking apparatus, a conduit adapted to communicate with a glass tank and provided with an outlet, a rotary member adjacent to said outlet having pockets in its periphery adapted to register therewith, ingot forming mechanism below said member comprising a hopper like receptacle, four wheels journaled at right angles to each other in the bottom of said receptacle, the peripheries of said wheels being concaved circumferentially and adapted to contact with each other, and means for rotating said member and wheels, said pockets being provided with outlet means communicating therewith for escape of air therefrom while they are being filled with glass.

In testimony whereof, I have hereunto set my hand at Los Angeles, California, this 16th day of November 1908.

WILLIAM D. KEEFER.

In presence of—
ARTHUR P. KNIGHT,
FRANK L. A. GRAHAM.